No. 789,995. PATENTED MAY 16, 1905.
D. C. McCAN.
WHEEL.
APPLICATION FILED OCT. 25, 1904.
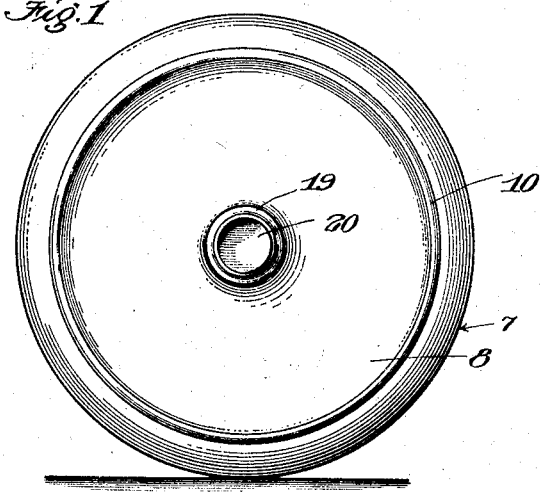
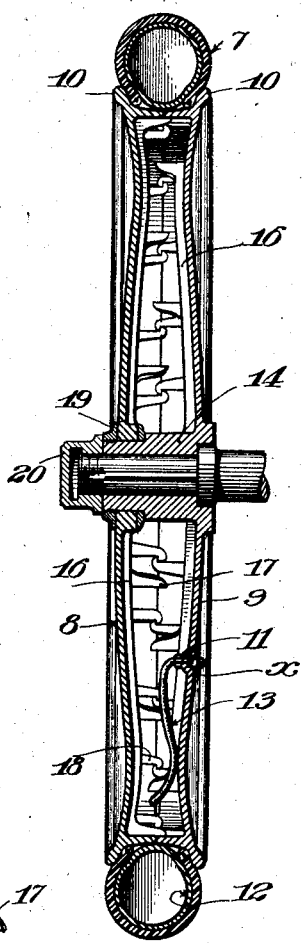
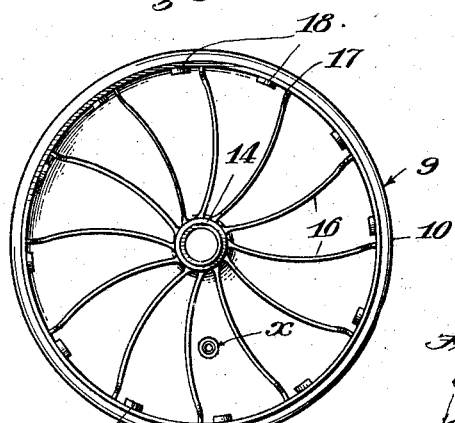
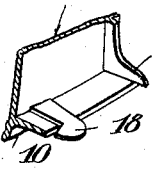
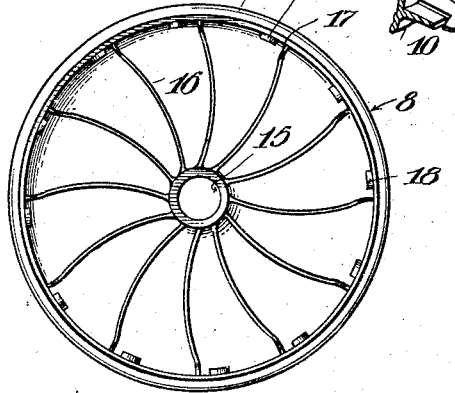
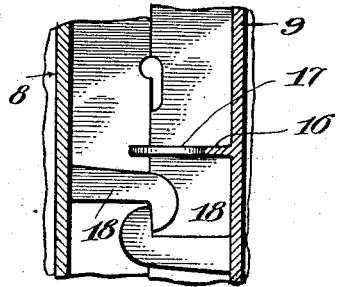
Witnesses
Inventor
David C. McCan
by Hazard & Harpham
Attorneys No. 789,995. Patented May 16, 1905.

UNITED STATES PATENT OFFICE.

DAVID C. McCAN, OF NORDHOFF, CALIFORNIA.

WHEEL.

SPECIFICATION forming part of Letters Patent No. 789,995, dated May 16, 1905.

Application filed October 25, 1904. Serial No. 229,984.

*To all whom it may concern:*

Be it known that I, DAVID C. MCCAN, a citizen of the United States, residing at Nordhoff, in the county of Ventura and State of California, have invented new and useful Improvements in Wheels, of which the following is a specification.

My invention relates particularly to spokeless wheels; and it consists in casting an inner and outer member and assembling these two members together to form a completed wheel.

My wheel is particularly adapted for use on automobiles on which rubber tires are used; and it is the object of my invention to simplify the construction of wheels; to do away with the use of spokes, which have a tendency to retard the movement of the wheel and to scatter the dust by the rapid revolution thereof; to strengthen, lighten, and otherwise improve the same; to so arrange the several parts that ready access may be obtained to the tire in case it becomes damaged, and to securely retain the inflated tire in place without the use of other securing means than the rims provided therefor on the wheel members. I accomplish these objects by the means of the device described herein and shown in the accompanying drawings, in which—

Figure 1 is a side elevation of a wheel embodying my invention with a pneumatic tire in place thereon. Fig. 2 is a central vertical section thereof. Fig. 3 is an internal elevation of the inner member. Fig. 4 is an internal elevation of the outer member. Fig. 5 is a fragment of a wheel member in perspective, showing one of the locking-lugs and bearing-seats. Fig. 6 is a cross-section through the wheel members in the locked position.

Referring to the drawings, 7 is a pneumatic tire in place on one of my improved wheels. My wheel is composed of an outer member 8 and an inner member 9, cast separately and in such shape that they may be readily assembled together, and thereby form a complete wheel. These members are cast out of suitable metal in the proper proportion to give strength, lightness, and rigidity to the wheel when assembled.

I have shown in Figs. 1 and 2 of the drawings an assembled wheel with a detachable tire in place thereon. On the perimeter of the wheel I provide the usual annular clencher-rims 10. The tire is secured to the rim by the union of the two clencher-rims, one on each member, and is held firmly by means thereof in place thereon.

11 represents the usual valve for inflating or deflating the inner tube 12. This valve is connected with the inner tube by means of the usual rubber tube 13 and projects through the inner member at the point $x$. (Shown in Figs. 2 and 3.) At this point the valve is covered by a screw-threaded cap adapted for engagement in the screw-threaded opening in the inner member of the wheel.

The inner member is cast with an outwardly-projecting hub 14, which projects, when the wheel members are assembled, through a central cylindrical opening 15 in the outer member. Extending radially from this opening 15 on the outer member and from the hub on the inner member and on the inner faces of these members are strengthening-ribs 16, which terminate in the inner rim of the members. The outer ends of these ribs 16 are enlarged and project beyond the rims of both members, forming seats or bearings 17 for the companion member to rest against and serving to interlock and to hold the members firmly together. As a further means for a more positive engagement of the two wheel members I provide on the inner perimeter of each member outwardly-projecting wedge-shaped locking-lugs 18, located adjacent to the enlarged portion of the radial ribs, which when brought together serve as additional means to wedge and interlock the two members securely together. A nut 19 on the hub forms additional means to hold these members in locked position. The axle is screw-threaded at its outer end for the reception of a screw-threaded cap 20.

Having described my invention, what I claim as new, and desire to secure by Letters Patent, is—

1. A wheel made up of an inner and outer member each having on its inner perimeter outwardly-projecting wedge-shaped locking-lugs adapted to engage and hold the members in locked engagement with each other.

2. A wheel made up of an inner and outer member each having on its inner perimeter outwardly-projecting wedge-shaped locking-lugs adapted to engage and hold the members in locked engagement with each other, in combination with means located at the hub to hold said members together.

3. A wheel comprising an inner and outer member having inwardly-projecting locking-lugs which interlock and hold the members together.

4. A wheel comprising an inner and outer member having inwardly-projecting locking-lugs which interlock and hold the members together, and seats or bearings which project inwardly for the companion member to rest against.

5. A wheel comprising an inner and outer member having inwardly-projecting locking-lugs which interlock and hold the members together, and strengthening-ribs having seats or bearings at their outer ends for the companion member to rest against.

6. A wheel comprising spokeless inner and outer members having inwardly-projecting annular flanges and clencher-rims at the perimeter, and interlocking lugs to hold the members together.

7. A wheel comprising spokeless inner and outer members having inwardly-projecting annular flanges and clencher-rims at the perimeter, interlocking lugs to hold the members together, one member having a hub and the other an orifice through which the hub protrudes, and a nut screwed thereon as a means at the hub to assist in holding the members together.

In witness that I claim the foregoing I have hereunto subscribed my name this 17th day of October, 1904.

DAVID C. McCAN.

Witnesses:
MYRTLE JONES,
G. E. HARPHAM.